No. 728,139. PATENTED MAY 12, 1903.
P. J. SMITH.
COTTON OR PEA PLANTER.
APPLICATION FILED NOV. 5, 1902.
NO MODEL. 2 SHEETS—SHEET 1.
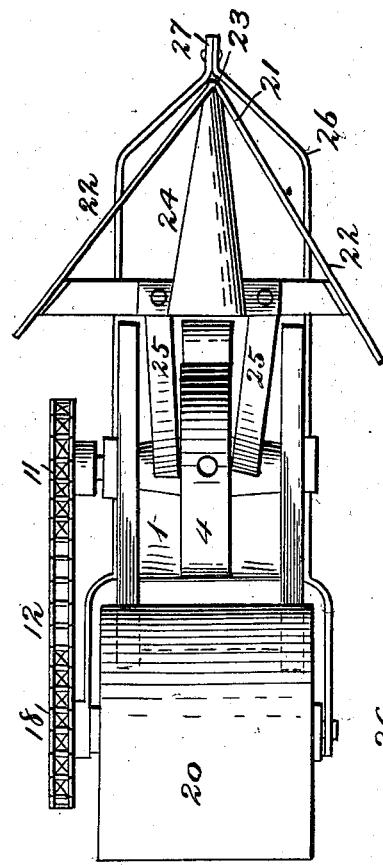
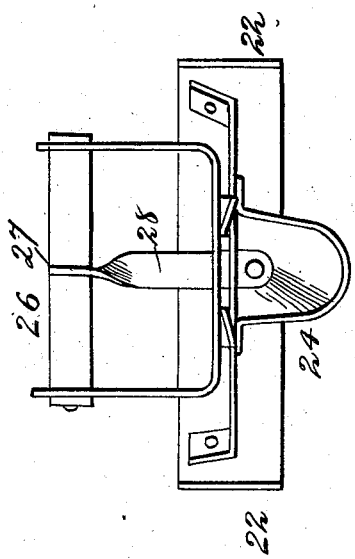
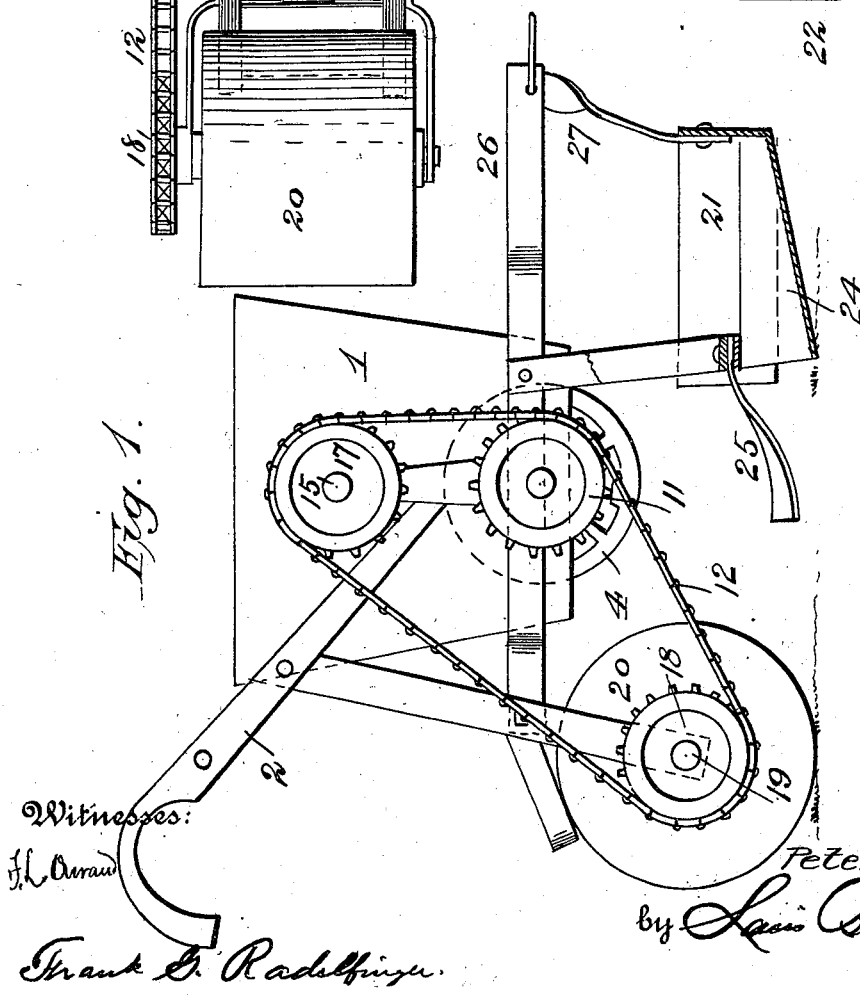
Inventor:
Peter J. Smith
by Lewis Bagger & Co.
Attorneys
Witnesses:
J. L. Ourand
Frank F. Radelfinger No. 728,139. PATENTED MAY 12, 1903.
P. J. SMITH.
COTTON OR PEA PLANTER.
APPLICATION FILED NOV. 5, 1902.
NO MODEL. 2 SHEETS—SHEET 2.
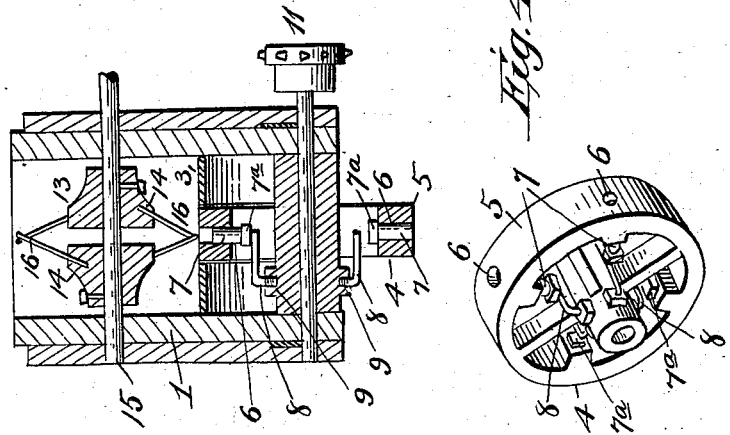
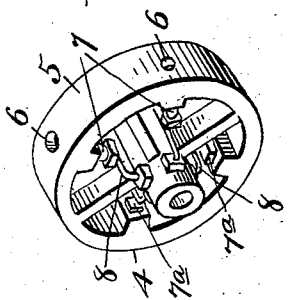
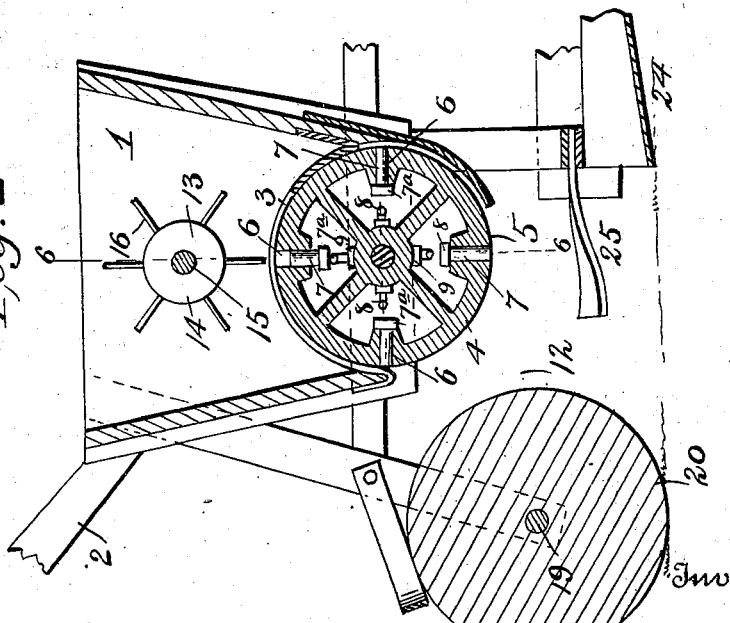
Witnesses.
F. L. Orrand
Frank G. Radelfinger
Inventor.
Peter J. Smith,
by Lewis Bagger & Co.,
Attorneys.

No. 728,139. Patented May 12, 1903.

UNITED STATES PATENT OFFICE.

PETER J. SMITH, OF COVINGTON, SOUTH CAROLINA, ASSIGNOR OF ONE-HALF TO CHARLES S. McCALL, OF COVINGTON, SOUTH CAROLINA.

COTTON OR PEA PLANTER.

SPECIFICATION forming part of Letters Patent No. 728,139, dated May 12, 1903.

Application filed November 5, 1902. Serial No. 130,159. (No model.)

*To all whom it may concern:*

Be it known that I, PETER J. SMITH, a citizen of the United States, residing at Covington, in the county of Marlboro and State of South Carolina, have invented new and useful Improvements in Cotton or Pea Planters, of which the following is a specification.

My invention relates to cotton and pea planters; and the object of the same is to construct a machine of this description which will be simple in construction and efficient in operation.

The simple and novel construction employed by me in carrying out my invention is fully described and claimed in this specification and illustrated in the accompanying drawings, forming a part thereof, in which—

Figure 1 is a side elevation of my planter with parts broken away. Fig. 2 is a vertical longitudinal section. Fig. 3 is a detail of the plow. Fig. 4 is a detail of the dropping-wheel. Fig. 5 is a bottom plan view of my planter. Fig. 6 is a vertical transverse section of the same on the line 6 6, Fig. 2.

Like numerals of reference designate like parts in the different views of the drawings.

The numeral 1 designates a seed-hopper of approved construction, having handles 2 secured thereto for use in guiding. The bottom 3 of the hopper is convex and has a slot therein to accommodate a dropping-wheel 4. The wheel 4 is provided with a rim 5, having seed-cups 6, formed by radial apertures, in which are mounted sliding plungers 7, having enlarged head 7ª to serve as stops. The capacity of the cups 6 can be regulated by means of adjustable stops consisting of arms 8, which are bent at right angles and threaded to fit sockets 9, formed in the hub of the wheel 4. The plungers 7 are operated by gravity to admit and expel the seed from the cups 6. The wheel 4 is carried by a shaft which bears a sprocket 11, over which a chain 12 passes.

The agitator 13 is mounted within the hopper 1 and comprises two hubs 14, keyed on a shaft 15 and bearing alternately-arranged converging arms 16, which keep the seed from packing in the hopper. A sprocket 17 is secured on the shaft 15 and is also driven by the chain 12, which passes over said sprocket 17, over the sprocket 11, and around a sprocket 18, which is carried by a shaft 19, which also carries a covering-roller 20, which comes in contact with the ground and serves to drive the planting mechanism as well as cover the seed planted.

A plow 21 is located in front of the hopper 1 and has diverging shares 22, which meet in a blunt point 23. Mounted just back of the point 23 is a V-shaped colter 24, carrying rearwardly-extending fingers 25 at each side thereof. The colter 24 is located so that the seed drops just at the rear of it and between the fingers 25. Means for hitching a horse to my planter is supplied by bars 26, which are connected together at 27 and support a hanger 28, which supports the plow 21.

In operation the hopper is filled with seed and the planter started. The agitator 13 will keep the seed stirred up, and it should be noted that since there is an interval between the hubs 14 the agitator will not pick up and hold the seed, as it is left free to drop between the hubs. As the wheel 4 rotates the plungers 7 will be operated by gravity to permit seed to enter the cups 6 and to force it out. The seed will drop into the furrow made by the plow 21 and colter 24, which furrow will be filled by the fingers 25 and roller 20 to cover the seed.

I do not wish to be limited as to details of construction, as these may be modified in many particulars without departing from the spirit of my invention.

Having thus described my invention, what I claim as new, and desire to secure by Letters Patent, is—

1. In a planter, the combination of a planting-wheel comprising a hub and a rim connected by spokes, said rim having radial apertures therein located intermediate said spokes, plungers slidingly mounted in said apertures and operated by gravity in both directions, said plungers having enlarged heads thereon which come in contact with the inner face of the rim and limit the outward movement of the plunger, stops mounted on said hub and comprising threaded shanks which engage threaded recesses in said hubs and arms which extend at right angles to said shanks in position to engage the enlarged heads of said plunger to limit the inward movement thereof, substantially as described.

2. In a planter, the combination of a hopper having converging sides, of a shaft extending transversely said hopper and bearing two hubs having square inner faces which oppose each other with an interval between to permit the seed to drop through, a series of inclined radial arms mounted in each of said hubs with the free ends of both series of said arms located in the same vertical plane passing midway between said hubs, substantially as described.

In testimony whereof I have hereunto set my hand in presence of two subscribing witnesses.

PETER J. SMITH.

Witnesses:
 J. W. SMITH,
 Z. E. MCCALL.